United States Patent
Persson (10) Patent No.: US 10,442,328 B2
(45) Date of Patent: Oct. 15, 2019

(54) ASSEMBLY, SYSTEM, AND CIRCUIT WITH COMBINED HEATING AND OCCUPANCY DETECTING FOR A VEHICLE SEAT

(71) Applicant: Kongsberg Automotive AB, Mullsjö (SE)

(72) Inventor: Mattias Persson, Munich (DE)

(73) Assignee: Kongsberg Automotive AB, Mullsjö (SE)

( * ) Notice: Subject to any disclaimer, the term of this patent is extended or adjusted under 35 U.S.C. 154(b) by 298 days.

(21) Appl. No.: 15/188,065

(22) Filed: Jun. 21, 2016

(65) Prior Publication Data

US 2017/0361744 A1 Dec. 21, 2017

(51) Int. Cl.
*B60N 2/56* (2006.01)

(52) U.S. Cl.
CPC ................... *B60N 2/5685* (2013.01)

(58) Field of Classification Search
USPC .................................................. 219/202, 217
See application file for complete search history.

(56) References Cited

U.S. PATENT DOCUMENTS

| | | | |
|---|---|---|---|
| 4,133,574 A * | 1/1979 | Martin | B60H 1/00378 165/43 |
| 5,229,579 A * | 7/1993 | Ingraham | B60H 1/2218 219/202 |
| 6,064,037 A * | 5/2000 | Weiss | A47C 7/74 219/217 |
| 6,341,504 B1 * | 1/2002 | Istook | A61B 5/0002 2/69 |
| 6,392,542 B1 * | 5/2002 | Stanley | B60N 2/002 280/735 |
| 6,540,303 B2 | 4/2003 | Mosquera | |

(Continued)

FOREIGN PATENT DOCUMENTS

| CN | 101352098 A | 1/2009 |
|---|---|---|
| CN | 204774813 U1 | 11/2015 |

(Continued)

OTHER PUBLICATIONS

English language abstract and machine assisted translation for JP2000333781, downloaded on Nov. 18, 2016; 11 pages.

(Continued)

*Primary Examiner* — Ibrahime A Abraham
*Assistant Examiner* — Gyounghyun Bae
(74) *Attorney, Agent, or Firm* — Howard & Howard Attorneys PLLC (57) ABSTRACT

Systems, assemblies and circuits are provided for combined heating and occupancy for vehicle seats wherein a plurality of conductors are arranged in a parallel circuit configuration with respect to each other and are attached to a seat mat. Each of the conductors is configured to generate heat in response to receiving an electrical current. Each of the conductors is configured to generate an electrical field in response to receiving an electrical signal and with the electrical field being recognizable for determining presence of an occupant on the seat. At least one bypass conductor is connected between two of the conductors to preserve heating and/or occupancy detection capabilities of the circuit in the event of breakage in any one or more of the conductors.

11 Claims, 4 Drawing Sheets

(56) References Cited

U.S. PATENT DOCUMENTS

| | | | |
|---|---|---|---|
| 6,663,175 B2 | 12/2003 | Mosquera et al. | |
| 6,703,845 B2* | 3/2004 | Stanley | B60N 2/002 280/735 |
| 6,782,316 B2* | 8/2004 | Breed | B60N 2/002 701/49 |
| 6,825,765 B2* | 11/2004 | Stanley | B60N 2/002 280/735 |
| 6,969,827 B2 | 11/2005 | Yoneyama et al. | |
| 7,205,902 B2* | 4/2007 | Kiribayashi | B60R 21/01516 307/10.1 |
| 7,581,584 B2* | 9/2009 | Yoneno | A47C 7/744 165/202 |
| 7,656,169 B2* | 2/2010 | Scheckenbach | B60N 2/002 280/735 |
| 7,705,271 B2 | 4/2010 | Hilmer | |
| 7,768,380 B2* | 8/2010 | Breed | B60N 2/002 340/425.5 |
| 7,791,476 B2* | 9/2010 | Hawkins | B60N 2/002 340/561 |
| 8,288,693 B2* | 10/2012 | Weiss | H05B 3/342 219/528 |
| 8,487,632 B2* | 7/2013 | Ootaka | B60R 21/01532 324/452 |
| 8,511,754 B2 | 8/2013 | Leponce et al. | |
| 8,669,492 B2* | 3/2014 | Ito | B60N 2/5685 219/202 |
| 8,814,262 B2 | 8/2014 | Abe et al. | |
| 8,882,142 B2* | 11/2014 | Lamesch | B60N 2/002 180/271 |
| 8,994,385 B2* | 3/2015 | Virnich | B60N 2/5685 324/658 |
| 9,067,518 B2* | 6/2015 | Aoki | B60N 2/5685 |
| 9,162,769 B2* | 10/2015 | Rauh | B64D 13/00 |
| 10,124,823 B2* | 11/2018 | Van'tZelfde | H03K 17/962 |
| 2009/0051196 A1 | 2/2009 | Ishii et al. | |
| 2009/0146470 A1 | 6/2009 | Thompson et al. | |
| 2014/0175078 A1 | 6/2014 | Davignon et al. | |
| 2016/0152111 A1 | 6/2016 | Tuskes | |

FOREIGN PATENT DOCUMENTS

| | | |
|---|---|---|
| DE | 202004012054 U1 | 1/2006 |
| DE | 102008010268 A1 | 8/2009 |
| DE | 102009038311 A1 | 2/2011 |
| DE | 102009042789 A1 | 5/2011 |
| DE | 102009059114 A1 | 6/2011 |
| DE | 102011121267 A1 | 6/2013 |
| DE | 102012004136 A1 | 8/2013 |
| DE | 102013216885 A1 | 2/2015 |
| EP | 1815717 A1 | 8/2007 |
| EP | 2052904 A1 | 4/2009 |
| EP | 2106964 A1 | 10/2009 |
| EP | 2559591 A1 | 2/2013 |
| JP | 2000333781 A | 12/2000 |
| JP | 2002000390 A | 1/2002 |
| JP | 2010000206 A | 1/2010 |
| JP | 5515439 A | 12/2010 |
| JP | 2011000945 A | 1/2011 |
| JP | 2013095348 A | 5/2013 |
| JP | 2013095349 A | 5/2013 |
| KR | 20010061863 A | 7/2001 |
| KR | 20110053869 A | 5/2011 |
| WO | WO2006056414 A1 | 6/2006 |

OTHER PUBLICATIONS

English language abstract and machine assisted translation for KR20010061863, downloaded on Nov. 18, 2016; 8 pages.

English language abstract and machine assisted translation for JP2002000390, downloaded on Nov. 18, 2016; 5 pages.

English language abstract and machine assisted translation for DE202004012054, downloaded on Nov. 18, 2016; 12 pages.

English language abstract and machine assisted translation for CN101352098, downloaded on Nov. 18, 2016; 22 pages.

English language abstract and machine assisted translation for EP2052904, downloaded on Nov. 18, 2016; 23 pages.

English language abstract and machine assisted translation for DE102008010268, downloaded on Nov. 18, 2016; 12 pages.

English language abstract and machine assisted translation for EP2106964, downloaded on Nov. 18, 2016; 15 pages.

English language abstract and machine assisted translation for JP2010000206, downloaded on Nov. 18, 2016; 11 pages.

English language abstract for JP5515439 not available. Machine assisted translation for JP2010284314(A) downloaded on Nov. 18, 2016; 20 pages.

English language abstract and machine assisted translation for JP2011000945, downloaded on Nov. 18, 2016; 14 pages.

English language abstract and machine assisted translation for DE102009038311, downloaded on Nov. 18, 2016; 22 pages.

English language abstract and machine assisted translation for DE102009042789, downloaded on Nov. 18, 2016; 14 pages.

English language abstract and machine assisted translation for KR20110053869, downloaded on Nov. 18, 2016; 35 pages.

English language abstract and machine assisted translation for DE102009059114, downloaded on Nov. 18, 2016; 9 pages.

English language abstract and machine assisted translation for EP2559591, downloaded on Nov. 18, 2016; 18 pages.

English language abstract and machine assisted translation for JP2013095348, downloaded on Nov. 18, 2016; 15 pages.

English language abstract and machine assisted translation for JP2013095349, downloaded on Nov. 18, 2016; 15 pages.

English language abstract and machine assisted translation for DE102011121267, downloaded on Nov. 18, 2016; 07 pages.

English language abstract and machine assisted translation for DE102012004136, downloaded on Nov. 18, 2016; 17 pages.

English language abstract and machine assisted translation for DE102013216885, downloaded on Nov. 18, 2016; 45 pages.

English language abstract and machine assisted translation for CN204774813, downloaded on Nov. 18, 2016; 10 pages.

English language abstract not available for EP1815717 (A1); Abstract of corresponding document: WO2006055414 (A1); downloaded on Dec. 8, 2016; 29 pages.

* cited by examiner

ASSEMBLY, SYSTEM, AND CIRCUIT WITH COMBINED HEATING AND OCCUPANCY DETECTING FOR A VEHICLE SEAT

BACKGROUND

1. Field of the Invention

The subject invention relates to combined heating and occupancy detecting circuits for a vehicle seat.

2. Description of Related Art

Vehicle seats have been known to include combined heating and occupancy detecting capabilities via an electrical grid disposed in the seat. Heating is provided to the seat via the electrical grid for the comfort of the occupant. The electrical grid is also used to determine whether an occupant is sitting on the seat for purposes such as determining whether to deploy the airbag associated with the seat.

Figures 1, 2:
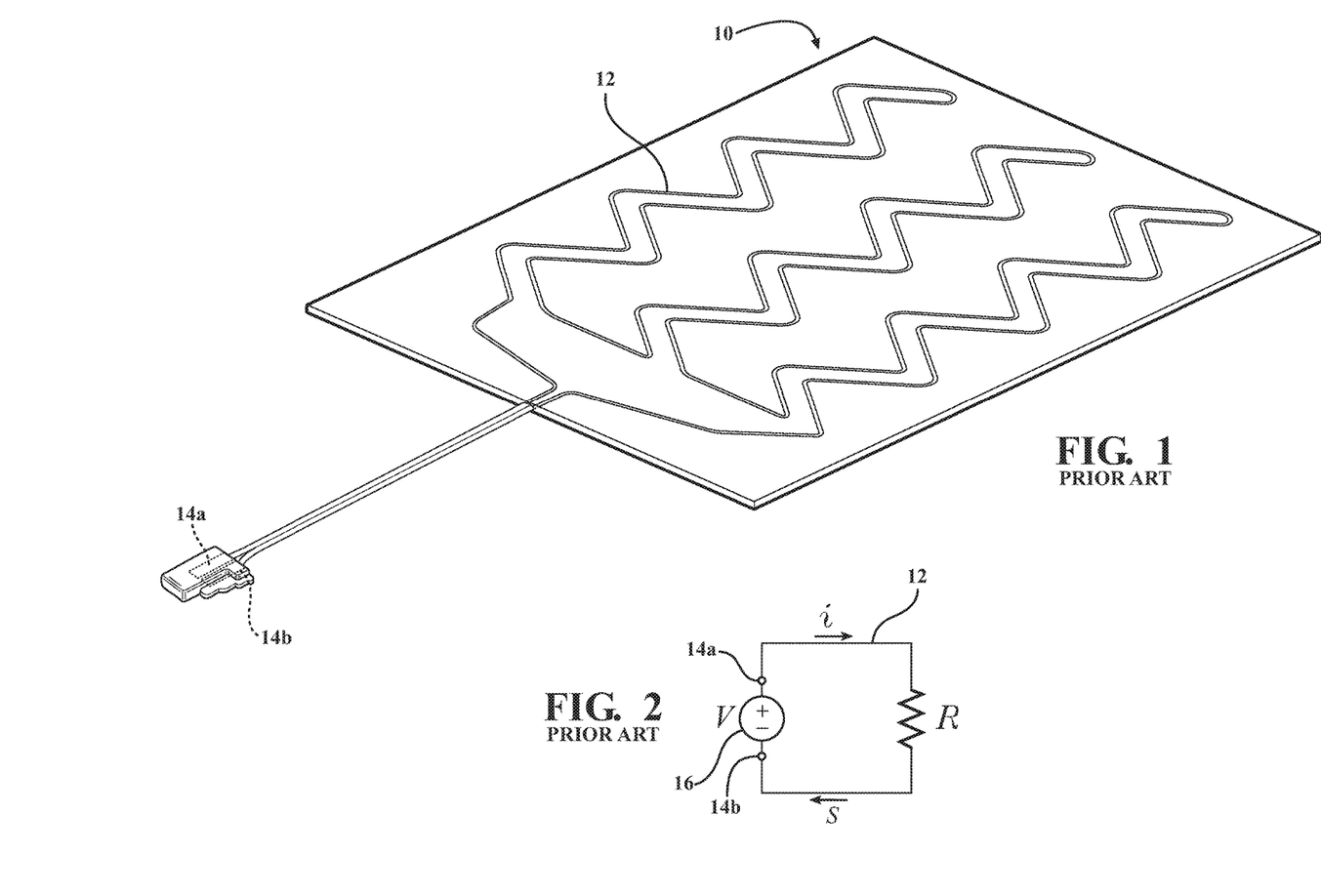
FIG. 1 is a perspective view of a seat mat of the prior art.
FIG. 2 is a circuit diagram relating to the prior art seat mat of FIG. 1.

FIG. 1 illustrates one example of a prior art electrical grid 10. The electrical grid 10 comprises a continuous single conductor 12 that often is disposed in a meandering path. The single conductor 12 starts at terminal 14a and terminates at terminal 14b. As shown in prior art FIG. 2, which is the circuit representation of the electrical grid 10 of FIG. 1, a power source 16 is connected to the terminals 14a, 14b. The single conductor 12 exhibits a resistance "R" along its length, which is a series-resistance because the grid 10 comprises only a single conductor 12. Electrical current flows through the single conductor 12 thereby generating heat in throughout the single conductor 12. An electrical signal "s" is sent through the single conductor 12 to allow the conductor 12 to generate an electrical field. This electrical field is detected by other components of an occupancy detection system for occupancy detection purposes.

One major deficiency in such prior art circuits is that the single conductor 12 is susceptible to breakage. Breakage may result from weaknesses formed in the single conductor 12 or simply from repeated usage of the seat over time. When the single conductor 12 breaks, the single conductor 12 becomes an open circuit such that there is no return path for the electrical current i for heating or the electrical signals s for occupancy detection. As such, breakage in the prior art circuits renders the entirety of the electrical grid 10 useless. In other words, both the heating and occupancy detection capabilities of the electrical grid 10 become disabled. If the occupancy detection capabilities are disabled, the occupancy detection system may fail to recognize an occupant and most critically, fail to deploy an airbag. Alternatively, the occupancy detection system may inadvertently recognize an occupant when there is no such occupant, thereby deploying an airbag, which is unnecessary and costly.

Accordingly, the prior art configuration suffers from lack of robustness, lack of reliability, and lack of secure alternatives in instances where breakage of the single conductor 12 occurs. Therefore, there are opportunities to address at least the aforementioned problems.

SUMMARY

One embodiment of an assembly for a vehicle seat is provided. The assembly comprises a seat mat and a plurality of conductors arranged in a parallel circuit configuration with respect to each other and being attached to the seat mat. At least one bypass conductor is connected between two of the conductors.

One embodiment of a combined heating and occupancy detecting system for a vehicle seat is provided. The system comprises a plurality of conductors arranged in a parallel circuit configuration with respect to each other and being attached to the seat. Each of the conductors is configured to generate heat in response to receiving an electrical current. Each of the conductors is configured to generate an electrical field in response to receiving an electrical signal. The electrical field is recognizable for determining presence of an occupant on the seat. At least one bypass conductor is connected between two of the conductors.

One embodiment of a combined heating and occupancy detecting circuit for a vehicle seat is provided. The circuit comprises a plurality of conductors arranged in a parallel circuit configuration with respect to each other and at least one bypass conductor connected between two of the conductors.

The assembly, system, and circuit address the major deficiency in the prior art circuits. By having the plurality of conductors arranged in a parallel circuit configuration with respect to each other, a single conductor configuration is avoided. The one or more bypass conductors provide a back-up path in the event that any of the parallel-arranged conductors breaks. Mainly, when any of the parallel-arranged conductors breaks, the conductors, by virtue of the bypass conductor(s), maintain a closed circuit such that there is still a return path for the electrical current for heating or the electrical signal for occupancy detection. As such, the assembly, system, and circuit maintain the combined heating and occupancy detection capabilities even when breakage of any one or more of the conductors occurs. The techniques and components described herein reduce the likelihood of heating system failure and the possibility that an occupancy detection system may fail to recognize or may inadvertently recognize presence of an occupant of the seat. Furthermore, in the event of partial breakage of any one or more of the conductors, the bypass conductor(s) provides relief from hot spots developing at partial breakage points of the conductor thereby minimizing the risk of occupant discomfort or fire.

Accordingly, the techniques and components described herein provide improved robustness, reliability, and security in instances where breakage of any one or more conductor occurs. Of course, the assembly, system, and circuit as descried herein may exhibit or provide advantages other than those described above. The advantages described above are not intended to limit the scope of the claimed invention. Furthermore, the techniques and components described herein may be characterized in ways other than the assembly, system, and circuit, consistent with the disclosure of the specification.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION

Referring to the Figures, wherein like numerals indicate like or corresponding parts throughout the several views, an assembly 20, system 30, and circuit 40 are provided for providing combined heating and occupancy detection for a vehicle seat 50.

Figures 3, 4:
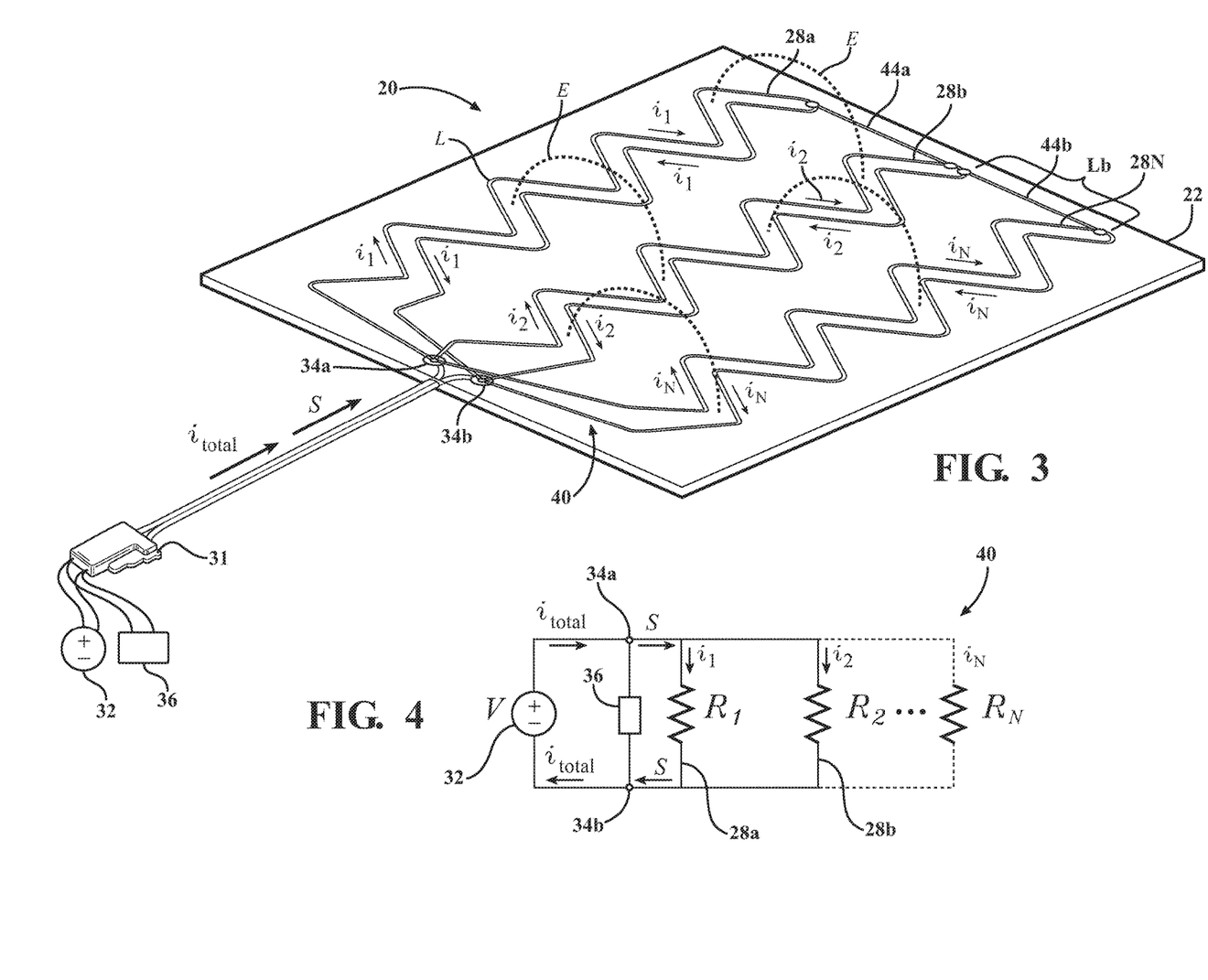
FIG. 3 is a perspective view of a seat mat according to one embodiment of the subject invention.
FIG. 4 is a circuit diagram showing conductors of the seat mat in FIG. 3 in a parallel-circuit configuration according to one embodiment of the subject invention.
Figure 8:
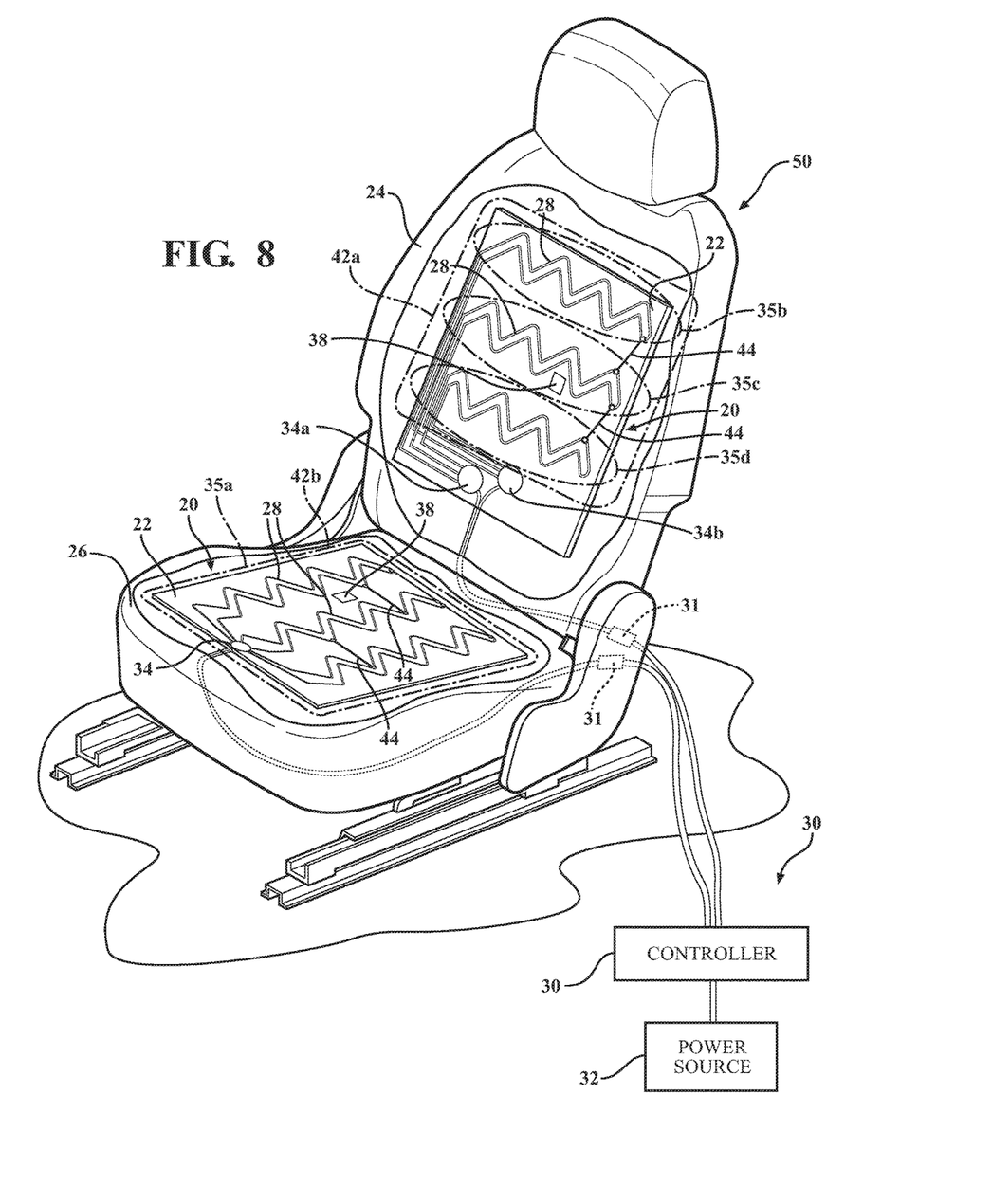
FIG. 8 is a perspective view of a vehicle seat having a seat cushion and seat back each broken away to show a separate seat mat according to the subject invention incorporated therein.

FIG. 3 illustrates one embodiment of the assembly 20 and the circuit 40, the significant portions of which are integrated into the assembly 20. In one example, the assembly 20 is comprises a seat mat 22. The assembly 20 is configured to be disposed in the vehicle seat 50, as shown in FIG. 8. The vehicle seat 50, according to one embodiment, includes a seat back 24 and a seat cushion 26. In one example as shown in FIG. 8, one seat mat 22 is provided for the seat back 24 and another seat mat 22 is provided for the seat cushion 26. As such, the vehicle seat 50 may comprise one or more seat mats 22. The vehicle seat 50 may have configurations and parts other than those shown in FIG. 8. Furthermore, the assembly 20 may be disposed in vehicle seat 50 according to any suitable technique or method. For example, the assembly 20 may be sewn or adhered to the seat back 24 and/or seat cushion 26. Generally, a substantial portion or entirety of the assembly 20 is concealed within the seat back 24 and seat cushion 26 such that the assembly 20 is not visible to occupants of the vehicle seat 50 after installation.

One example of seat mat 22 and how the seat mat 22 may be connected to the vehicle seat 50 is described in U.S. application Ser. No. 14/947,587, filed Nov. 20, 2015, the disclosure of which is hereby incorporated by reference in its entirety. As described according to one embodiment therein, the seat mat 22 comprises a carrier layer, which carries the conductors 28 extending over a heating area. The carrier layer of the seat mat 22 is air permeable and comprises felt, fleece, woven material or cut foam. A seat cover upholstery comprises a foam layer and is connected to a surface of the seat mat 22 that carries the conductors 28. The seat mat 22 is in direct contact with the seat cover and is sewn by stitches going through the seat cover, the seat mat 22, and the seat cover upholstery to form seams extending through the heating area. Those skilled in the art appreciate that the seat mat 22 may have other configurations and the seat mat 22 may connect to the vehicle seat 50 according to other configurations not specifically described herein.

As shown in FIG. 3, the assembly 20 and circuit 40 each comprise a plurality of conductors 28. The conductors 28 are attached to the seat mat 22. The seat mat 22 and the conductors 28 may be integrated into a single component. Preferably, the conductors 28 are all disposed in a common layer in the seat mat 22 such that the conductors 28 are flat and coplanar. The conductors 28 may be attached to the seat mat 22 according to any suitable technique or method.

One benefit of combining heating and occupancy detection capabilities into the seat mat 22 is that such combination allows for easier and more accurate service in the event of malfunction or replacement of the seat mat 22. Mainly, because the capabilities are combined into a single unit, the seat mat 22, as a whole can be replaced without affecting other components or systems. Furthermore, calibration efforts between the heating and occupancy detection functionalities are minimized because the replacement seat mat 22 would be pre-calibrated such that the heating and occupancy detection operations are properly adjusted before installation.

Each conductor 28 generally forms a loop that comprises any suitable configuration such as a zig-zag configuration, a meandering configuration, or the like, for spreading heat or occupancy detection capabilities throughout the seat 50. The assembly 20 may comprise any suitable number of parallel-configured conductors 28. In one embodiment, as shown in FIG. 3, the assembly 20 comprises three conductors 28.

The conductors 28 may comprise any suitable conductive material, such as copper, and the like. Additionally, the conductors 28 may comprise any suitable configuration, such as single wire, stranded wire, flat braids, and the like. In one embodiment, less overall area of each conductor 28 circuit loop and more conductor 28 circuit loops are preferred over greater overall area of each circuit conductor 28 loop and less conductor 28 circuit loops.

FIG. 4 shows a general circuit representation of the conductors 28 of the seat mat 22 of FIG. 3 (without the bypass conductors 44 described below). In FIG. 4, two conductors 28a, 28b are shown for simplicity, although more conductors 28n are possible.

Each conductor 28a, 28b exhibits an electrical resistance. Here, the first conductor 28a has resistance $R_1$ and the second conductor 28b has resistance $R_2$. It is to be appreciated that the resistance R as shown throughout the figures do not require inclusion of separate resistors included in the circuit path. Instead, the resistances R may be the sum of the intrinsic resistances of each conductor 28. The electrical resistance R of each conductor 28 is largely defined by a length L and other electrical properties of each conductor 28, such as a conductivity of the material of the conductor 28. For example, the electrical resistance R of each conductor 28 may be greater for a longer length L than a shorter length L, less for a larger cross sectional area as compared with a smaller cross sectional area. The length L of each conductor 28 is described in detail below. It is to be appreciated that the length L of each conductor 28a, 28b is not to scale as shown in the circuits 40 illustrated throughout the figures. The electrical resistance R of the conductors 28a, 28b may be substantially similar to one another or different from one another.

A power source 32 is connected to each of the conductors 28. The power source 32 may be the vehicle battery or a separate power distribution module in the vehicle. The power source 32 comprises a positive (+) terminal and a return (−) terminal. In one embodiment, the length L of each conductor 28 is defined starting from where each conductor 28 initially connects to the positive (+) terminal of the power source 32 and ending where the conductor 28 first connects to the return (−) terminal of the power source 32.

An intermediate conductive terminal may be provided between the power source 32 and each conductor 28. For example, as shown in FIG. 3, the seat mat 22 is provided with two terminals 34a, 34b wherein one terminal 34a connects to the positive (+) terminal of the power source 32 and the other terminal 34b connects to the return (−) terminal of the power source 32. In FIG. 3, one end of each of the conductors 28 connects to the same terminal 34a, and the other end of each of the conductors 28 connects to the same terminal 34b. As such, the length L of each conductor 28 may be defined as the length of the conductor 28 between the terminals 34a, 34b. The terminals 34a, 34b may have any suitable configuration, such as a connector, bonding pad, or any other suitable connection point. Additionally, the terminals 34a, 34b may be separated or integrated into a single unit.

As shown in FIG. 4, the assembly 20 may comprise an electrical connector 31 for connecting to the power source 32. Specifically, wires 33 are provided between the terminals 34a, 34b of the seat mat 22 and the connector 31. The wires 33 have any suitable length for allowing easy assembly and/or installation of the seat mat 22. The connector 31 connects to an opposing connector (not shown) provided from an electrical distribution system of the vehicle. The opposing connector routes to the power source 32 and controller 36 through the electrical distribution system of the vehicle. The assembly 20 may connect to the power source 32 and controller 36 according to other configurations not specifically described herein.

The power source 32 provides a common voltage V across each of resistors $R_1$, $R_2$, affiliated with conductors 28a, 28b. In turn, electrical current "i" flows through each of the conductors 28 via the power source 32. As described below, the electrical current i may be the same or different for each of the conductors 28. The total electrical current exiting and returning to the power source 32 is designated as $i_{total}$. The total current $i_{total}$ is the sum of the currents through the individual conductors 28. Some of $i_{total}$ flows through each of the conductors 28a, 28b causing the conductors 28a, 28b to generate heat used for heating the vehicle seat 50. For example, in FIG. 4, a first current $i_1$ flows through the first resistor $R_1$ associated with the first conductor 28a and a second current $i_2$ flows through the second resistor $R_2$ associated with the second conductor 28b, wherein $i_{total}=i_1+i_2$. As such, each of the conductors 28a, 28b is configured to generate heat in response to receiving some of the total current $i_{total}$ from the power source 32 for heating the seat mat 22.

In one embodiment, the power source 32 is configured to provide voltage V according to any suitable voltage range, such as between 5-13 volts. Furthermore, the electrical current i may be a direct current (DC) defined according to any suitable current range, such as between 1-5 amps. The power source 32 and/or electrical current i may have any suitable configuration for allowing sufficient current to flow through the conductors 28 for heating the seat 50.

Each conductor 28 may also exhibit or be rated to have any suitable irradiance or radiant flux (power) per unit area. For example, each conductor 28 may have irradiance in the range between 50 watts/m2 to about 1500 watts/m2.

The conductors 28 of the assembly 20 are arranged in a parallel circuit configuration with respect to each other. The parallel circuit configuration may be referred to as a multiple-circuit pattern. FIGS. 3 and 4 illustrate one example of the parallel circuit configuration. Each of the conductors 28 on the common seat mat 22 are connected to the common power source 32. Mainly, each of the conductors 28 is separately connected to the same terminals 34a, 34b connectable to the common power source 32. Such a configuration allows the conductors 28 to be arranged in a parallel circuit configuration with respect to the common power source 32. This configuration ensures that the conductors 28 are connected in parallel.

As such, by parallel configuration, it is to be understood that the conductors 28 are connected in parallel such they have the same potential difference (V) provided from the power source 32 across their respective resistances $R_1$, $R_2 \ldots R_n$, etc. The same voltage V is applicable to all conductors 28 connected in parallel.

The parallel configuration is contrasted with a series configuration wherein the same current i flows through each conductor 28 (or a single conductor 28 as shown in FIG. 2) in the circuit 40 and there is only one path in a series circuit in which the current i can flow. The series configuration is often referred to as an offset circuit pattern.

It is to be appreciated that the parallel configuration applies to conductors 28 that are provided on the same seat mat 22 or assembly 20. In other words, when more than one seat mat 22 is provided, it is not necessary that one conductor 28 from one seat mat 22 be in parallel with another conductor 28 from another seat mat 22.

For heating purposes, the parallel-configured conductors 28 may be arranged in one or a plurality of different heating zones 35a-35n with respect to the seat mat 22, as shown in FIG. 8, for example. For example, in FIG. 8, the seat cushion 26 has one heating zone 35a, and the seat back 24 has three separate heating zones 35b, 35c, 35d. Each heating zone 35 may be configured to heat a different part of the seat mat 22 or vehicle seat 50, generally. The seat mat 22 may include any suitable number of heating zones 35. The heating zones 35 may be disposed according to any suitable configuration or arrangement with respect to the seat back 24 and seat cushion 26. Preferably, having numerous conductors 28 is desirable over a single conductor 28 to provide sufficient heating for the vehicle seat 50.

The path of the conductors 28 may be formed to define the one or more heating zones 35. Any one or more of the conductors 28 may define any one or more heating zones 35. Alternatively, each separate conductor 28 may define a separate heating zone 35. The conductors 28 in each heating zone 35 may be controlled independently or dependently. When more than one conductor 28 is used to define one heating zone 35, the conductors 28 in that heating zone 35 are disposed in the parallel configuration described herein. Similarly, where only one conductor 28 is used to define one heating zone 35, the other conductors 28, used to define another one or more heating zones 35 on the same mat 22 are disposed in parallel with the one conductor 28.

In addition to the heating capabilities, each of the conductors 28 is further configured to generate an electrical field "E", as shown in FIG. 3, in response to receiving an electrical signal "s." In accordance with the system 30, as shown in FIG. 8, one or more controllers 36 are configured to provide the electrical signal s to the conductors 28. The electrical field E is recognizable for determining presence of the occupant on the seat 50. The controller 36 may comprise any suitable components for generating the signal s. The signal s may be transmitted continuously or discretely to the conductors 28. Furthermore, the signal s may be a DC or AC waveform having any suitable waveform configuration, such as a sinusoidal, square, impulse, or triangular waveform. The signal s travels from the controller 36, through the conductors 28 and back to the controller 36. Accordingly, with the combined heating and occupancy sensing capabilities described herein, each conductor 28 can simultaneously have the electric current i flowing therethrough for heating purposes and the signal s transmitted therethrough for occupancy detection purposes. It is to be appreciated that the electrical current i and the signal s may also be transmitted from the same connector 31 and wires 33 or a different set of connector and wires.

Although the powers supply 32 and the controller 36 have been described and shown as separate components, it is be appreciated that the powers supply 32 and the controller 36 may be combined into a single component, module or assembly to perform the aforementioned features. Furthermore, more than one signal s may be transmitted to the conductors 28 for occupancy detection purposes.

In one embodiment, presence of the occupant is detected via capacitive sensing. In such instances, the conductors 28 effectively form an antenna for occupant detection purposes as the signal s flows through each of the conductors 28. The antennae form the electrical field E that is detectable. The electrical field E as shown in FIG. 3 is provided for illustrative purposes and may have any suitable radiation pattern other than that shown.

In some instances, a unique electrical field E may be generated depending on certain characteristics of the signals s and the conductor 28 or combination of conductors 28. Each conductor 28 may generate an electrical field E that is unique from all other conductors 28. Similarly, one combination of conductors 28 may an electrical field E that is unique from all other combination of conductors 28. Furthermore, uniqueness of the electrical field E may be defined by certain electrical field properties such as, frequency, amplitude, phase, and the like.

Capacitance may be formed between adjacent parallel conductors 28. Presence of the occupant on the seat 50 may disrupt or change characteristics of the capacitance because the body of the occupant is electrically conductive. The controller 36 is configured to monitor characteristics of the electrical fields E or the capacitance for occupancy detection purposes.

In one embodiment, the characteristics of the electrical fields E or the capacitance may be measured directly from return of the signals s from the conductors 28. In other embodiments, a sensor 38, such as a capacitive sensor or an electrical field sensor, may be employed adjacent the conductors 28 for measuring characteristics of the electrical fields E or the capacitance. The sensor 38 may be in communication with the controller 36, which can make determination about occupancy based on sensor 38 measurements.

With the parallel configuration of the conductors 28, occupancy sensing may be based on the electrical fields E or the capacitance of any one more conductors 28. For example, the electrical fields E or the capacitance of two conductors 28 may be used to detect occupancy whereas a third conductor 28 is not used. One conductor 28 may be unused for occupancy detection depending on various factors, such as bodily positioning of the occupant on the seat back 24 of the seat cushion 26.

The controller 36 is configured sense changes in the characteristics of the electrical fields E or the capacitance for determining or signaling another component to make a determination about occupancy of the seat 50. In response to determining that the seat 50 is occupied or unoccupied, other vehicle systems can be modified. For example, a passenger airbag may be activated if occupancy is detected and disabled if no occupancy is detected. Those skilled in the art appreciate that other vehicle systems other than airbags may utilize the occupancy sensing determination for various controls.

For occupancy detection purposes, the parallel-configured conductors 28 may be arranged in one or a plurality of different occupancy detection zones 42a-42n with respect to the seat mat 22, as shown in FIG. 8, for example. In FIG. 8, for instance, one occupancy detection zone 42a is defined on the seat back 24 and another occupancy detection zone 42b is defined on the seat cushion 26. Each occupancy detection zone 42 may be configured to detect occupancy of a different part of the seat mat 22 or vehicle seat 50. The seat mat 22 may include any suitable number of occupancy detection zones 42. The occupancy detection zones 42 may be disposed according to any suitable configuration or arrangement with respect to the seat back 24 and seat cushion 26.

The path of the conductors 28 may be formed to define the one or more occupancy detection zones 42. Any one or more of the conductors 28 may define any one or more occupancy detection zones 42. Alternatively, each conductor 28 may define a separate occupancy detection zone 42. The conductors 28 in each occupancy detection zone 42 may be controlled independently or dependently. Of course, where more than one conductor 28 is used to define one occupancy detection zone 42, the conductors 28 in that occupancy detection zone 42 are disposed in the parallel configuration described herein. Alternatively, where only one conductor 28 is used to define one occupancy detection zone 42, the other conductors 28, used to define another one or more occupancy detection zones 42 are disposed in parallel with the one conductor 28.

In accordance with one major aspect of the assembly 20, system 30, and circuit 40, a bypass conductor 44, as shown throughout FIGS. 3-8 is provided and is connected between two of the conductors 28. As will be described below, the bypass conductor 44 contributes to heating and occupancy detection in the event of breakage of one of the conductors 28.

The bypass conductor 44 may comprise any suitable conductive material and configuration. For example, the bypass conductor 44 may have the same or different material and configuration from the other conductors 28. In one example, the bypass conductor 44 is comprised of steel. The bypass conductor 44 is connected between at least two of the conductors 28 via any suitable method, such as soldering, crimping, or the like.

FIG. 3 shows the seat mat 22 comprising the bypass conductor 44. The bypass conductor 44 may connect to the conductors 28 at any suitable location along the length L of each conductor 28. In one embodiment, as shown in FIG. 3, the bypass conductor 44 connects to each of the two conductors 28 at a substantially common location along the length L of each conductor 28. In another example, as shown in FIG. 8, the bypass conductor 44 connects to each of the two conductors 28 at different relative locations along the length L of each conductor 28.

As shown in FIG. 3, the bypass conductor 44 may have any suitable length "$L_b$" depending on the location of connection to each of the conductors 28. Furthermore, the path of the bypass conductor 44 may have any suitable shape, such as a straight line, a curve, a meandering shape, or the like. The path of the bypass conductor 44 may be configured to facilitate sufficient heating and occupancy detection in lieu of the broken conductor 28.

Where the bypass conductor 44 connects to only two conductors 28, the bypass conductor 44 comprises a single conductive segment. Alternatively, the bypass conductor 44 may connect between more than two conductors 28. For example, the bypass conductor 44 may connect to three, four or five other conductors 28. In such situations, the bypass conductor 44 may comprise any suitable number of conductive segments. For example, certain segments of the bypass conductor 44 may be spliced into other segments to allow the bypass conductor 44 to connect to any suitable number of other conductors 28.

In other embodiments, as shown in FIG. 3 for example, more than one bypass conductor 44 may be provided. Any suitable number of bypass conductors 44 may be provided depending on factors such as the configuration of the circuit 40, the number of conductors 28 present, and the level of redundancy desired by the bypass conductors 44. In FIG. 3, there are three conductors 28a, 28b, and 28n. One bypass conductor 44a connects between the first and second conductors 28a, 28b, while the other bypass conductor 44b connects between the second and third conductors 28b, 28n, and so on. This way, each bypass conductor 44a, 44b, connects only to adjacent conductors 28. In addition, more than one bypass conductor 44 may connect between adjacent conductors 28a, 28b. For example, one bypass conductor 44a may be connected at one-third of the length L of the adjacent conductors 28a, 28b while the second bypass conductor 44b connects at two-third of the length L of the same adjacent conductors 28a, 28b.

Alternatively or additionally, any one or more of the bypass conductors 44a, 44b may skip over an adjacent conductor 28 such that the bypass conductor 44 connects to a non-adjacent conductor 28. For instance, in the same example described above, one bypass conductor 44a may connect between the first and third conductors 28a, 28n, while the other bypass conductor 44b connects between the second and third conductors 28b, 28n, etc. The path of the bypass conductor 44 may be disposed in such a way that contact with skipped-over conductors 28 is avoided. Furthermore, any suitable measures may be taken to ensure that the bypass conductor 44 is electrically insulated from the other conductors 28, such as those that may be skipped over, and the like.

Figure 5:
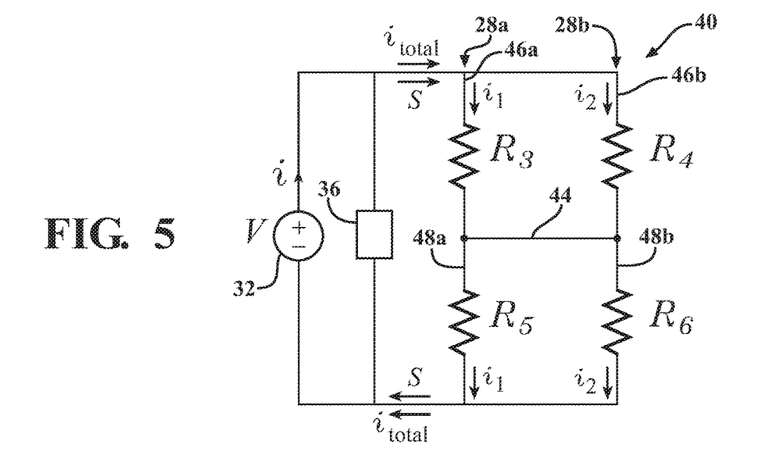
FIG. 5 is a circuit diagram of the seat mat in FIG. 3 further comprising a bypass conductor connected between parallel conductors according to one embodiment of the subject invention.

FIG. 5 shows one example the circuit 40 comprising the bypass conductor 44 connected between a first conductor 28a and a second conductor 28b. The circuit 40 in FIG. 5 is based off the circuit 40 in FIG. 4 wherein conductors 28a, 28b exhibit respective resistances of $R_1$ and $R_2$. Because the bypass conductor 44 connects between the two conductors 28a, 28b, the bypass conductor 44 splits each conductor 28a, 28b into a first segment 46a, 46b and a second segment 48a, 48b. In turn, the electrical resistances of each conductor 28a, 28b, i.e., $R_1$ and $R_2$, are also split. That is, the bypass conductor 44 splits the electrical resistance of each of the two conductors 28a, 28b into a first resistance and a second resistance. Specifically, $R_1$ is split into $R_3$ and $R_5$ where $R_1=R_3+R_5$, and $R_2$ is split into $R_4$ and $R_6$ where $R_2=R_4+R_6$. The split resistances $R_3$-$R_6$ may each have a resistance that depends on the connection location of the bypass conductor 44 relative to the length L of each conductor 28a, 28b. Where, for example, the bypass conductor 44 bisects the conductor 28a, the first resistance is equal to the second resistance for one or more of the conductors 28. For instance, $R_3$ would be equal to $R_5$ if the bypass conductor 44 bisects conductor 28a. Alternatively, the first resistance may be different from the second resistance for one or more of the conductors 28. In the same example, $R_3$ would be different from $R_5$ if the bypass conductor 44 splits the length L of the conductor 28a unevenly thereby resulting in each conductor segment having a different length.

In accordance with the properties of the conductors 28 described above, the bypass conductor 44 also exhibits an electrical resistance (not shown) depending on its length $L_b$ and properties. In one example, the bypass conductor 44 and each of the conductors 28 to which it connects have a substantially similar electrical resistance. Alternatively, each of the conductors 28 may have an electrical resistance being less than the electrical resistance of the bypass conductor 44 such that the bypass conductor 44 does not significantly interfere with current flow during un-broken state of the conductors 28.

In FIG. 5, during heating without any breakage in the conductors 28a, 28b, the electrical current i flows from the power source 32 through each of the main circuit branches of the first and second conductors 28a, 28b. Specifically, some of the total electrical current $i_{total}$ is split into $i_1$ in the first conductor 28a and some of the electrical current $i_{total}$ is split into $i_2$ in the second conductor 28b. The amount of electrical current i through each circuit branch depends on the respective resistances $R_3$-$R_6$. In this scenario where no breakage has yet occurred, no current or a negligible amount of flows through the bypass conductor 44. As such, the conductors 28a, 28b generate heat across the entirety of their respective lengths L pursuant to the flow of electrical current i.

In FIG. 5, during occupancy detection without any breakage in the conductors 28a, 28b, the electrical signal s is transmitted from the controller 36 through each of the main circuit branches of the first and second conductors 28a, 28b. In some instances, some of the electrical signal s is split through the first conductor 28a and some of the electrical signal s is split through the second conductor 28b. In such scenarios where no breakage has yet occurred, no meaningful part of the electrical signal s flows through the bypass conductor 44. As such, the conductors 28a, 28b generate the electrical field E across the entirety of their respective lengths L pursuant to the transmission of the electrical signal s therethrough.

Since the bypass conductor 44 connects between two of the conductors 28, the bypass conductor 44 is configured to redirect the electrical current i for heating purposes from one of the conductors 28 to another one of the conductors 28 in response to breakage of a portion of one of the conductors 28. Similarly, the bypass conductor 44 is configured to redirect the electrical signal s for occupancy detection purposes from one of the conductors 28 to another one of the conductors 28 in response to breakage of a portion of one of the conductors 28. In other words, if one of the two conductors 28 that are connected by the bypass conductor 44 were to break, the electrical current i and/or the electrical signal s would flow through the bypass conductor 44 instead of the broken portion of the conductor 28 that encountered breakage. Such redirection is possible because the conductors 28 are connected in parallel configuration. Breakage may result from weaknesses formed in any of the conductors 28 or simply from repeated usage of the seat 50 over time.

Figure 6:
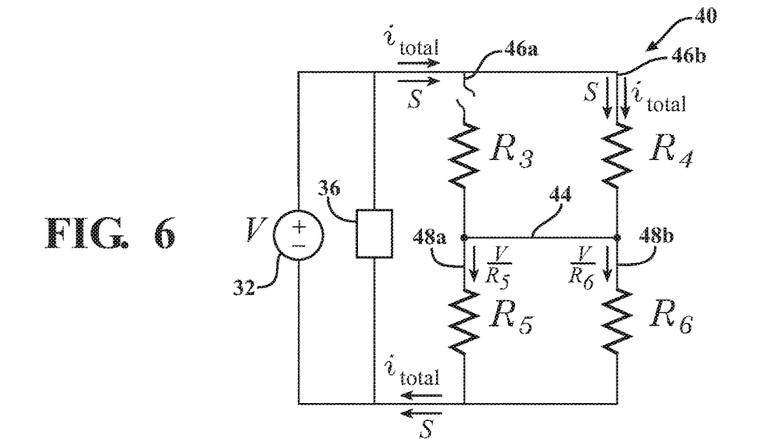
FIG. 6 is a circuit diagram of the circuit of FIG. 5 wherein a breakage of one of the conductors occurs according to one example.

To illustrate such advantages of the bypass conductor 44, the circuit 40 of FIG. 6 shows breakage of the first conductor 28a. Specifically, breakage occurs in the segment of the first conductor 28a between the positive (+) terminal of the power source 32 and the connection point of the bypass conductor 44 to the first conductor 28a, i.e., the high side of the bypass conductor 44. As such, the electrical current i and/or the electrical signal s do not flow through $R_3$. Instead, the total electrical current $i_{total}$ and/or the electrical signal s flow initially through $R_4$ of the second conductor 28b. Thereafter, the total electrical current $i_{total}$ and/or the electrical signal s reach a node connecting the segment of the second conductor 28b comprising $R_6$ and connecting the bypass conductor 44. Here, the total electrical current $i_{total}$ and/or the electrical signal s split between the segment 48b of the second conductor 28b comprising $R_6$ and the bypass conductor 44. Specifically, the current through $R_5$ is defined as $V/R_5$ and the current through $R_6$ is defined as $V/R_6$.

Ultimately, the total electrical current $i_{total}$ and the electrical signal s return to the power source 32 and controller 36, respectively. As such, despite breakage of the segment of the first conductor 28a, electrical current i and the electrical signal s are provided with a closed circuit path. Instead of complete disablement of the conductors 28a, 28b, the portion of the second conductor 28b is preserved via the bypass conductor 44.

Thus, the entire first conductor 28a and the second conductor 28b are able to maintain generation heat across the closed circuit portions of their respective lengths L pursuant to the flow of electrical current i. Similarly, the entire first conductor 28a and some of the second conductor 28b are able to maintain generation of the electrical field E across the closed circuit portions of their respective lengths L pursuant to the transmission of the electrical signal s therethrough. Additionally, the bypass conductor 44 may provide an additional or substitute conductive length for heating and/or occupancy detection purposes in lieu of the broken segment 46a of the first conductor 28a. The bypass conductor 44 provides a back-up path in the event that any of the parallel-arranged conductors 28a, 28b breaks. Mainly, when any of the conductors 28a, 28b breaks, the conductors 28a, 28b, by virtue of their parallel configuration and the bypass conductor 44, maintain a closed circuit such that there is still a return path for the electrical current i for heating and/or the electrical signals s for occupancy detection. As such, the combined heating and occupancy detection capabilities of the circuit 40 are preserved even when breakage of any of the conductors 28a, 28b occurs. In turn, this configuration reduces the likelihood of heating system failure and the possibility that an occupancy detection system may fail to recognize or may inadvertently recognize presence of an occupant of the seat.

Furthermore, the bypass conductor 44 may operate in situations where there is a partial breakage in any one or more of the conductors 28 rather than a complete (open-circuit) breakage. In such situations, the conductor 28 maintains a closed circuit, however, because there is partial breakage, the conductor 28 exhibits an abnormally high resistance at the partial breakage point. In turn, the electrical current i may cause an uncomfortable or unsafe temperature level in the conductor 28. In such instances, the bypass conductor 44 provides relief from such hot spots developing at partial breakage points of the conductor 28 by providing a less-resistive path for the electrical current i. In response, less electrical current i flows through the partial breakage point, thereby minimizing the risk of occupant discomfort or fire.

Figure 7:
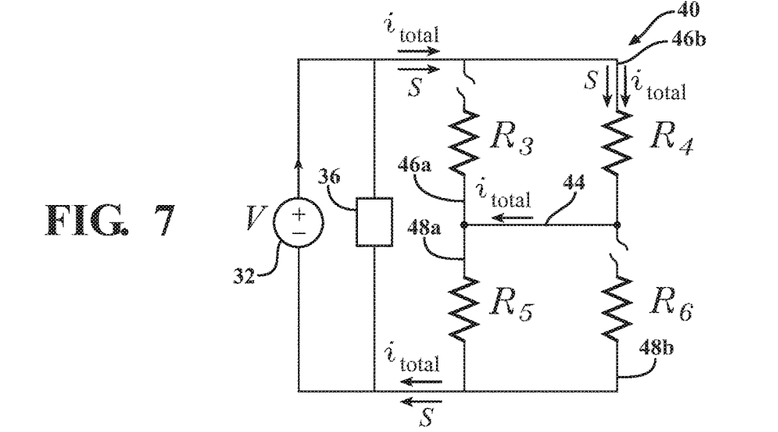
FIG. 7 is a circuit diagram of the circuit of FIG. 5 wherein a breakage of two conductors occurs according to one example.

As shown in FIG. 7, two of the conductors 28a, 28b may break instead of one. In such instances, the bypass conductor 44 still provides the aforementioned benefits. The circuit 40 of FIG. 7 shows breakage of the first conductor 28a and second conductor 28b. Specifically, breakage occurs in the first segment 46a of the first conductor 28a between the positive (+) terminal of the power source 32 and the connection point of the bypass conductor 44 to the first conductor 28a, i.e., the high side of the bypass conductor 44. Breakage also occurs in the second segment 48b of the second conductor 28b between the return (−) terminal of the power source 32 and the connection point of the bypass conductor 44 to the second conductor 28b, i.e., the low side of the bypass conductor 44. As such, the total electrical current $i_{total}$ and/or the electrical signal s do not flow through the first segment 46a or $R_3$. Instead, the total electrical current $i_{total}$ and/or the electrical signal s flow initially through $R_4$ of the first segment 46b of the second conductor 28b. Because the second segment 48b of the second conductor 28b, the total electrical current $i_{total}$ and/or the electrical signal s also do not flow through $R_6$. Thereafter, because the total electrical current $i_{total}$ and/or the electrical signal s have no other current path, they cross the bypass conductor 44 to the second segment 48a of the first conductor 28a and ultimately return to the power source 32 and controller 36, respectively. As such, despite breakage of the respective segments 46a, 48b of the first and second conductors 28a, 28b, electrical current i and the electrical signal s are provided with a closed circuit path preserving heating and occupancy detection capabilities via the closed portions of the first and second conductors 28a, 28b.

In response to breakage of a portion of any one or more of the conductors 28, the total electrical resistance of the circuit 40 may change from the un-broken state of the circuit 40. If this happens, the controller 36 is configured to detect changes in electrical resistance of the conductors 28 individually or the total resistance of the circuit 40 as a whole. For example, the controller 36 may make this determination by having predetermined values for the current i and voltage V and deriving the total resistance therefrom. The controller 36 may be tap into any portion of the circuit 40 and/or power source 32 to make such determinations.

In response, the controller 36 is further configured to trigger a warning in response to detecting such changes in electrical resistance. The warning may be stored as an error message in a memory module in the vehicle. Ultimately, the vehicle occupant may be notified of such warning via an on-board message such as "heated seat error," "occupancy sensing malfunction" and the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. An assembly for a vehicle seat, comprising:
    a seat mat;
    a controller comprising a memory module and being configured to generate an electrical signal;
    a plurality of conductors attached to said seat mat and arranged in a parallel circuit configuration with respect to terminals connected to a power source, wherein each of said plurality of conductors comprises a resistive material and is configured to generate heat in response to receiving an electrical current from the power source for heating said seat mat and to generate an electrical field in response to receiving the electrical signal from said controller;
    one or more of said plurality of conductors being arranged in a first heating zone with respect to said seat mat and one or more of said plurality of conductors being arranged in a second heating zone with respect to said seat mat, said first and second heating zones being configured to heat different portions of said seat mat;
    said controller being configured to control the electrical current from the power source to control heat generated by said first heating zone and said second heating zone, independently;

an electrical field sensor disposed adjacent to said plurality of conductors and being configured to sense the electrical field;

said controller being coupled to said electrical field sensor, and based on the sensed electrical field, said controller being configured to determine presence of an occupant on said seat mat; and at least one bypass conductor comprising resistive material and being connected between said one or more of said plurality of conductors in said first heating zone and said one or more of said plurality of conductors in said second heating zone, wherein said one or more of said plurality of conductors comprises a first type of material and wherein said at least one bypass conductor comprises a second type of material different from the first type of material, and in response to breakage of a portion of said one or more of said plurality of conductors in said first heating zone, said at least one bypass conductor is configured to redirect the electrical current and the electrical signal from said one or more of said plurality of conductors of said second heating zone to said first heating zone.

2. The assembly of claim 1 wherein said at least one bypass conductor comprises steel.

3. The assembly of claim 1 wherein said controller is further configured to detect a change in electrical resistance of said conductors in response to breakage of a portion of one of said conductors.

4. The assembly of claim 3 wherein said controller is further configured to bigger a warning in response to detecting a change in electrical resistance.

5. The assembly of claim 1 wherein each of said two of said plurality of conductors defines a length and wherein said at least one bypass conductor is connected to each of said two of said plurality of conductors at a substantially common location along the length of each conductor.

6. The assembly of claim 1 wherein said plurality of conductors have a substantially similar electrical resistance.

7. The assembly of claim 1 wherein said at least one bypass conductor splits an electrical resistance of each of said two of said plurality of conductors into a first resistance and a second resistance.

8. The assembly of claim 7 wherein the first resistance is equal to the second resistance for one or more of said two of said plurality of conductors.

9. The assembly of claim 7 wherein the first resistance is different than the second resistance for one or more of said two of said plurality of conductors.

10. The assembly of claim 1 wherein said at least one bypass conductor and each of said two of said plurality of conductors have a substantially similar electrical resistance.

11. The assembly of claim 1 wherein each of said two of said plurality of conductors has a first electrical resistance and wherein said at least one bypass conductor has a second electrical resistance being greater than the first electrical resistance.

* * * * *

UNITED STATES PATENT AND TRADEMARK OFFICE
CERTIFICATE OF CORRECTION

PATENT NO. : 10,442,328 B2
APPLICATION NO. : 15/188065
DATED : October 15, 2019
INVENTOR(S) : Mattias Persson

Page 1 of 1

It is certified that error appears in the above-identified patent and that said Letters Patent is hereby corrected as shown below:

In the Claims

Column 14, Line 2 (Claim 4): delete "bigger a warning" and replace with --trigger a warning--

Signed and Sealed this
Thirty-first Day of March, 2020

Andrei Iancu
*Director of the United States Patent and Trademark Office*